2,991,174
PROCESS OF PRODUCING CHROMIUM STEEL
Carl L. McVicker, Homewood, Ill., and William J. Taylor, Pittsburgh, Pa., assignors to Chromium Mining & Smelting Corporation, Limited, Sault Sainte Marie, Ontario, Canada, a corporation of Ontario
No Drawing. Filed July 1, 1958, Ser. No. 745,840
6 Claims. (Cl. 75—60)

The invention relates to a process of producing a chromium steel of relatively low carbon content in which a relatively pure oxidized ferrochromium is utilized to increase the chromium content and to facilitate the removal of carbon from the steel, and more particularly relates to a process of producing chromium steel having a chromium content above 4%, by weight, such as those commonly referred to in the art as stainless steels.

In the process of producing a chromium steel in which a ferrochromium containing carbon is employed as a component, it is desirable to bring oxygen into contact with the molten metal for the purpose of decarburizing the melt. Such oxygen reacts with carbon contained in the molten steel to form gaseous carbon oxides such as carbon monoxide and carbon dioxide. These gaseous carbon oxides are then removed from the furnace. The oxygen is introduced in gaseous form by being blown over the surface of the molten metal until the carbon content of the melt has been lowered to the desired amount. Hitherto, the component composed of relatively pure ferrochromium has been unoxidized. Since the carbonized ferrochromium is a major contributor of carbon to the original charge, it is evident that the oxygen blowing time varies almost directly with the amount of carbon therein. This invention turns upon substituting an oxidized carbonized ferrochromium for any standard ferrochromium having ½% or more carbon.

Explanation of the invention will proceed best by describing generally a process of making stainless steel and in detail that part of such process which the present product and step alters.

A conventional process of making a stainless steel heat is generally as follows. An electric arc furnace is charged with stainless steel scrap, a ferrochromium containing carbon and carbon steel scrap, the components of which and the relative quantities of which will be discussed in a moment. The temperature is then brought up until the major portion of the charge is molten. Thereupon, an oxygen lance is applied to the surface for the purpose of removing the carbon. Blowing is continued until chemical tests show that the desired carbon level is attained. The time of the blow is variable dependent upon the rate of injection of oxygen and the total pounds of carbon and silicon to be removed. The melt is worked first with an oxidizing slag and then with a reducing slag. While working with the reducing slag, the steelmaker adds low carbon ferrochromium and very pure nickel, usually in sheet form until the melt is up to specification.

The step in this process with which this invention is concerned is the addition of the high carbon ferrochromium in the original charge to the furnace. Describing this product and step in detail, it will be observed that there is practically no carbon in the stainless steel scrap and .2% or less in the steel scrap. The charge chrome is a relatively pure ferrochromium containing, however, 4% or more of carbon. It is apparent that it is this carburized ferrochromium together with the release of carbon by the furnace electrodes which together are primarily responsible for putting the undesirable carbon into the melt. Since the amount of energy required to melt this high carbon ferrochromium per pound is much greater than that required per pound to melt the stainless steel scrap, because of its eutectic, or the steel, it would seem that it would be better not to add any of this carbonized ferrochromium to the original charge but to wait until the reducing slag stage, and add any necessary chromium as low carbon ferrochromium. The reason for adding it initially is because the price of 4%+ carbon ferrochromium is substantially less than that of low carbon ferrochromium. What the steelmakers do is to analyze with great care the amount of iron, chromium, manganese, and nickel required in the finished product for a single batch. Having knowledge of the amounts of these elements in each of the components of the charge, they determine how much ferrochromium, and/or nickel, with which we are not concerned here, must be added, and they then apportion the amount of additional chromium required between low carbon ferrochromium and the 4%+ ferrochromium so that considering blowing time, energy requirements and price differences of the two ferrochromiums, they can introduce as much of this less expensive carburized ferrochromium into the original charge as possible. The resulting proportion is, of course, affected by the necessity of having a certain percentage of iron associated with the chromium.

Describing now a present furnace charge, the original charge may consist, by weight, of approximately 90% of stainless steel scrap, approximately 5% of ferrochromium usually having around 4% carbon, and approximately 5% of carbon steel scrap usually having about .2% carbon. It is evident that the carbon in this batch is contributed primarily by the ferrochromium. In the foregoing components of the charge, the ferrochromium, at say 5% carbon, is contributing 25 times as much carbon as the carbon steel scrap. The amount contributed by the stainless scrap is almost negligible for it contains about .06% carbon; in determining the effectiveness of this invention, this will be ignored. During the melting process, the furnace electrodes contribute a substantial amount of carbon, but the amount is not capable of exact determination excepting for a given heat. This carbon will be ignored in determining the effectiveness of this invention because this invention will not increase or reduce the amount of carbon added to the melt by the electrodes, although in shortening the blowing time, it would reduce the carbon added by the electrodes.

The amount of carbon that has to be removed can roughly be determined by the oxygen blowing time. The lance nozzle for the oxygen is not dipped below the surface of the melt with the result that the carbon in the melt reacts with this oxygen only at the metal surface. The amount of oxygen emitted by the lance is several times the amount of oxygen required to combine with all of the carbon in the melt. At the end of the oxygen-blowing step, the carbon of the melt is at about .06 or .08.

The feature of this invention is the substitution of an oxidized carburized ferrochromium for the present unoxidized carburized ferrochromium. As will appear hereinafter, the applicant roasts an 8% or 9% carbon ferrochromium in an oxidizing atmosphere until the carbon has been reduced to about 4–5% and the ferrochromium oxidized by addition of 4–5% of oxygen. This has been done where the average particle size is 1 to 2 inches and again where the particle size was almost fines, less than ¼ inch. Broadly, the advantage lies in two facts. Firstly, the component of the original charge that provides most of the objectionable carbon now provides sufficient oxygen to at least decarburize itself. Secondly, this oxygen is in situ with the very carbon that one wishes to remove. As will appear hereinafter, the measure of the success of the product and the process resides in the reduction of the blowing time. By reducing the blowing time, the cost of the process is substantially reduced, Also, by reducing the blowing time, there is evidence that more chromium is recovered, that is, there is less chromium in the oxidizing slag. During any decarburizing of a ferrochromium product, it is impossible to avoid some formation of chromium oxide which moves into the slag. The problem is to separate the oxygen of the carburized $FeCr_2O_3$ molecule from the FeCr alloy and transfer it directly to the carbon. In the roasting furnace, the high carbon ferrochromium particle is not brought to a state of fusion and it seems that as the carbon is driven off as CO or $CO_2$, the iron chromium in a heated but solid state picks up oxygen. Where the high carbon ferrochromium is brought up to a liquid state, the iron chromium oxide tends to break down while the combining of the carbon with oxygen at the higher temperature becomes more rapid. As long as the iron molecule and the chromium molecule remain combined, in whatever manner, as an alloy in the liquid state, the weight is such that they will remain in the melt. Nevertheless, as indicated above, some chromium molecules will dissociate from the iron molecules to form a straight chromium oxide, which rises into the slag.

It is a general object of the invention to provide a process for making steel in which oxidized ferrochromium is used to introduce chromium into the molten steel bath and to decarburize the steel-forming material.

A further object of the invention is the provision of a process for increasing the chromium content and decreasing the carbon content of a molten steel through the use of particles of oxidized ferrochromium having an oxygen-containing outer shell so as to facilitate the reaction of such oxygen with carbon contained in the ferrochromium.

A further object of the invention is to provide a process for making steel in which the molten steel bath contains carbon and oxidized ferrochromium, a substantial portion of the oxygen of the ferrochromium being in reactive proximity to a substantial portion of the carbon in the molten steel bath.

It is another object of the invention to provide a process for the making of stainless steel in which at least a portion of the oxygen introduced into the molten steel bath for the purpose of decarbonization is provided by an oxidized ferrochromium which is comemrcially available in a relatively pure form.

A more specific object of the invention is to provide a process for making stainless steel in which oxidized ferrochromium is employed so as to effect a susbtantial reduction of the amount of gaseous oxygen utilized for the partial decarbonization of the molten steel.

Another object of this invention is to produce a product which contains as much oxygen as possible of the lowest chromium oxide, namely, $Cr_2O_3$ with the least amount of undesirable substances. In explanation, chromite ores are composed of large percentages of $Cr_5O_7$ as well as any one of the four other common but lower chromium oxides in addition to high percentages of non-metallic oxides which constitute impurities in the steel-making process. This oxide is extremely costly to reduce but the removal of a large proportion of the undesirable non-metallics explains the existence of the expensive furnace processes necessary to eliminate the oxygen. It will be noted that there appears to be a duplication of effort when one views the processing of chromite ore by producers of high carbon ferrochromium and the refining of stainless steel. The ferrochromium producers add carbon during the purification of the ferrochromium. The steel producers then add oxygen in order to eliminate the carbon. These aparently inconsistent processes are employed because of the greater relative ease of removal of carbon as compared to the non-metallics originally contained in the chromite ore. Indeed, in place of the high carbon ferrochromium commonly used in the original charge in the refining of stainless steel and which in the example above consisted of 5% of the charge, chromite ore has been used, and discarded. Applicants' object, therefore, is to produce a product relatively free from undesirable elements and which has at least enough oxygen in it to combine with the carbon in the product, and if possible with an excess of oxygen to combine with any other carbon found in the original charge.

Further objects and advantages will be apparent from the following description of a preferred process embodying the invention and specific examples hereinafter set forth.

The oxidized carbonized ferrochromium employed in the process embodying the invention is one that is produced by subjecting unoxidized ferrochromium to an oxidizing treatment. The ferrochromium to be oxidized is preferably an alloy of iron and chromium containing 50% or more of chromium and having a carbon content ranging from about 3% to about 10%. This ferrochromium may be the usual product of the submerged arc electric furnace. It is preferred that the silicon content of the ferrochromium be kept rather low and the silicon analysis should be less than 5% silicon, preferably less than 2½% silicon. The balance of the ferroalloy, apart from the chromium, carbon and silicon, is substantially all iron with incidental small amounts of other metals such as aluminum, magnesium and calcium. Preferably, also, the ferroalloy contains only very small percentages of sulphur and phosphorous.

The oxidizing of the ferrochromium is preferably performed under oxidizing roasting conditions which may be conveniently carried out in a rotary kiln or in a Herreshoff roaster. Any suitable type of roaster may be employed that can be operated under oxidizing conditions and in which the material may be subjected to stirring or agitation. The material is subjected to rabbling, as in a Herreshoff roaster, or to a rolling and tumbling action, as in a rotary kiln, whereby the material undergoing roasting is stirred to expose effectively all of its surfaces to the oxidizing gases in the roaster.

Carbon-containing ferrochromium of the normal commercial grades is highly exothermic when heated at or near its fusion point in an oxidizing atmosphere and a great difficulty has heretofore been encountered in attempting to roast this material. When once ignited, such ferrochromium oxidizes rapidly with release of much heat and attendant rapid rise in temperature. Uncontrolled oxidation and fusion of the material result. Oftentimes the temperature of the roaster rises to a point where serious damage is done to the roasting apparatus. Fusion of the ferrochromium is objectionable in that large masses of ferrochromium are formed that are difficult to process subsequently.

It has been found that the degree of oxidation of carbon-containing ferrochromium can be controlled accurately and that a smooth and efficient roasting operation can be accomplished where the granular size of the material charged to the roaster is carefully controlled. It is desirable to have the silicon analysis of the charged material within the values indicated hereinbefore in order to avoid uncontrolled oxidation in the roaster. The temperature of the roast is kept below the fusion point of the material as it passes through the roaster but the temperature should be at least about 1000° C. in order that the rate of reaction may proceed at a commercially feasible rate. Maximum roasting temperatures depend upon analysis of the carbon-containing ferrochromium and may be from about 1350° C. to 1400° C.

Of the controllable variables, granular size is of paramount importance. The carbon-containing ferrochromium is usually crushed in a jaw crusher or gyratory crusher, several stages of crushing being employed to reduce the large lumps of cast ferrochromium to the size desired for roaster feed. In the final stage of crushing, the crusher is adjusted to produce a material having a particle size ranging from 1/16" diameter to ½" diameter. The entire sequence of crushing of the carbon-containing ferrochromium is conducted so as to yield a final product having a minimum amount of fines. Of course, it is not possible to entirely eliminate fines, but every effort is made to do so. Where an undue amount of fines is produced the material may be classified to eliminate such fines as may be deleterious in the roasting operation. Excessive quantities of fines in the crushed product increase the likelihood of uncontrolled oxidation in the roaster. The preferred range of granular size for the roaster feed is from ⅛" diameter to ⅜" diameter.

If the silicon content of the high carbon ferrochromium runs much above 5%, undesirable exothermic roasting may occur; if the silicon content is below about 1%, the roasted material is very hard and tough and is difficult to grind for subsequent processing.

The crushed and, if necessary, sized carbon-containing ferrochromium is charged to a rotary kiln, for example, that is fired at the discharge end with coal or gas. A substantial excess of air over that required for combustion of the fuel is used in order to create an oxidizing atmosphere in the roaster. As the material passes through the roaster, it is rolled and tumbled and thoroughly exposed to the oxidizing atmosphere in the roaster. A minimum temperature of about 1000° C. may be imparted to the charge and the roasting temperature is adjusted as necessary to maintain the charge below the fusion point as it passes through the roaster. Partial oxidation of the material takes place in the roaster without fusion and without a rapid reaction that would cause undesired burning of material and equipment.

The carbon-containing ferrochromium that is fed to the roaster contains a small percentage of slag that is an unwanted impurity. Even with careful cleaning of the feed material some slag always remains. In the roaster, this slag which has a lower fusion point than the ferrochromium, fuses and separates from the metal. The slag adheres to the surfaces of the roaster and is easily removed on periodical clean-outs of the equipment. This separation of the slag from the metal substantially decreases the amount of slag impurities in the final product.

Upon completion of the roasting, the oxidized ferrochromium is discharged in particle form from the kiln and cooled. Such roasted ferrochromium is generally only partially oxidized, the oxygen being largely contained as a skin or shell around the ferrochromium particle. The thickness of the shell of oxidized ferrochromium will, of course, vary according to the extent of oxidation of the ferrochromium.

While the carbon content of the oxidized ferrochromium is decreased by the roasting, it is generally between 1% and 5%, by weight. It has been found that oxidized ferrochromium having a carbon content of approximately 4%, by weight, is suitable for use in the making of 17% chrome steel.

The oxygen contained in the roaster product is in a form which facilitates its combination with the carbon of the product as well as the carbon of the other components of the steel-forming material with which it may be mixed. The gaseous carbon oxides such as carbon monoxide or carbon dioxide formed by the oxidizing of the carbon are easily removed from the melt. The conditions of roasting such as the length of time of roasting, continual exposure of the ferrochromium to an oxidizing atmosphere, agitation of the particles of ferrochromium, and maintenance of optimum oxidizing temperatures determine both the amount and ratio of the oxygen and carbon contained in the ferrochromium. While it is possible to oxidize the ferrochromium to a point where the oxygen is insufficient to combine with the carbon in the product, it is preferred that the roasting be carried out under conditions in which the oxygen content of the roasted product is equal to or greater than the amount required to combine with the carbon content of the product. Where there is an excess of reactive oxygen in the ferrochromium over that required to combine with the carbon, the oxidized ferrochromium is, in effect, a carbon-free chromium additive which may be used to reduce the carbon content of other of the steel-forming materials.

Where the roasted ferrochromium has a 4% carbon content, the ratio of the oxygen to carbon, by weight, generally varies according to the particle size of the roasted ferrochromium. Where the ferrochromium is of a particle size of less than 2 inches (including fines), there is approximately one part of oxygen to one part of carbon. Where the particle size of the ferrochromium is less than 2 inches but more than ¼ inch, the ratio of oxygen to carbon is approximately 0.9 to 1, respectively. Where the particle size of ferrochromium is less than ¼ inch, the ratio of oxygen to carbon is approximately 2 to 1, respectively. The preferred ratio of oxygen to carbon of the ferrochromium used in the steel making process embodying the invention is between 0.5 and 2.5 parts of oxygen to one part of carbon, by weight.

It has been found that a relatively pure oxidized ferrochromium of a type which has been described serves a dual purpose in that it simultaneously increases the chromium content of the steel melt and decreases the carbon content of the melt.

A valuable commercial application of the process embodying the invention results from the use of the oxidized ferrochromium in the process of making a stainless steel in which gaseous oxygen is also blown over the surface of the molten steel. In such process, the use of the oxidized ferrochromium effects a considerable reduction in the blowing time of the gaseous oxygen as will be hereinafter described.

The following process embodying the invention is directed to the making of stainless steel. This process is carried out in an electric furnace. Such a furnace usually utilizes three carbon electrodes hung from holders above the furnace, the electrode supports being automatically controlled so as to raise and lower the electrodes as desired during the process. The electric furnace can be tilted so as to pour either slag or liquid metal, or both. Preferably, the furnace includes auxiliary equipment and accessories so that workmen may conveniently examine, sample, rake, stir, or otherwise treat the furnace charge.

Generally, the electric furnace is charged with the steel-forming material before the current is supplied to the electrodes. While the process embodying the invention is applicable to the making of stainless steels of varying composition, the following description is directed to that type of stainless steel commonly known as 17% chrome steel. In making 17% chrome steel, the furnace charge comprises 17% chrome scrap (scrap of the same metal to be produced), charge chrome (oxidized ferrochromium) and carbon steel scrap (scrap having an average carbon content in excess of that desired in the 17% chrome steel product). In an average instance, the 17% chrome scrap is used in the amount of approximately 90% of the charge weight, the oxidized ferrochromium in the amount of approximately 5% of the charge weight, and the carbon scrap in the amount of approximately 5% of the charge weight. The oxidized ferrochromium has a particle size of minus 2 inches and plus ¼ inch: its composition is as follows:

| Fe, percent | Cr, percent | O, percent | C, percent | Si, percent |
|---|---|---|---|---|
| 38.9 | 51 | 4.5 | 4.7 | 0.9 |

After the charge is supplied to the furnace, the electrodes are lowered to about one inch above the charge. The electric current is supplied to the electrodes so that an electric arc is provided between electrodes to create intense heat in the furnace. As the charge begins to melt, the molten or liquified metal trickles to the bottom or hearth area of the furnace. During this melting period, the electrodes are progressively lowered to a point immediately above the surface of the molten metal in the bottom of the furnace. As further melting of the charge raises the level of the melt, the electrodes are raised to maintain their position immediately above the melt. It is possible, of course, that the arc will travel at times through or around the unmelted particles of the charge and at other times will travel through the liquified metal. In either event, the intense heat created by the electric arc eventually melts all of the original charge material.

When at least a major portion of the steel-forming material has been melted, an oxygen lance in the form of a hollow metal pipe is lowered to a point immediately above the surface of the melt. Gaseous oxygen flows from the oxygen lance over the molten metal, reducing the carbon content of the melt by the formation of gaseous carbon oxides which are removed from the furnace. The action of the gaseous oxygen is in addition to the decarburization provided by the oxidized ferrochromium. This latter reaction is initiated as soon as heat is applied to the furnace, and proceeds at an accelerated rate when the charge materials are in a molten state. The step of blowing gaseous oxygen over the melt complements the action of the oxidized ferrochromium so that each source of oxygen contributes to the reduced time required for lowering the carbon content of the melt to the desired amount.

After subjecting the melt to the presence of oxygen at elevated temperatures for a period of time, the carbon content of the steel bath is lowered to an amount of from 0.06% to 0.08%, by weight. The exact carbon content of the melt at any point is determined by the testing of samples taken directly from the furnace. The length of time of blowing the gaseous oxygen over the melt is dependent upon such factors as the amount of carbon originally in the melt, the oxygen content of the oxidized ferrochromium content, the rate of flow of oxygen, and the like.

After the carbon content of the melt has been lowered to approximately 0.07%, by weight, burned lime in the amount of from 4,000 lbs. to 8,000 lbs. is added to the surface of the melt. The burned lime tends to liquify the slag which has been thickened by the formation of chromium oxide during oxidation of the carbon.

For reduction of the chromium content of the slag, a mixture of chromium and silicon is added to the furnace. This is frequently ferrochrome silicon containing approximately 40% chromium and approximately 40% silicon. The amount of ferrochrome silicon added is approximately 5% of the charge weight depending upon the degree of excess chromium in the slag. The silicon reduces at least a portion of the chromium oxide in the slag to metallic chromium. Reduction of the chrome oxide is indicated by observation of the fluidity of the slag.

After the chrome oxide has been reduced to about 4%, the furnace is tilted and a substantial portion of the slag is poured off the melt. Much of the remaining slag is raked off by an operator with a rabble until a minimum slag layer remains.

As it is desirable that the final chrome steel product contain approximately 17% chromium, the final adjustment of the chromium content of the molten steel is made by the addition of low carbon ferrochroium. Generally, from 5% to 7% of chromium in the form of low carbon ferrochromium is added at this point. The chromium content of the melt before and after the addition of the low carbon ferrochromium may be determined by laboratory analysis. Until substantially all of the low carbon ferrochromium has been melted, burned lime in an amount of from 3,000 to 6,000 lbs. is added on top of the low carbon ferrochromium to form a protective layer and later to form a reducing slag.

To further refine the steel by removal of undesirable non-metallics, a suitable slag is made by the addition of one or more slag-making materials such as lime, alumina, silica, or the like. Composition of such slag is determined by visual observation so that further additions may be made, if necessary, of one or more of the above materials.

The 17% chrome steel of proper purity and composition now contained within the furnace is stirred or agitated to achieve a homogeneous composition. Where testing shows that the desired specifications have been met, the melt is topped into a ladle and the 17% chrome steel product is poured from the ladle into suitable molds, castings, or the like.

The process which has been described is of an average instance of a batch process for producing 17% chrome steel. The following table shows the results of five different heats in which oxidized ferrochromium containing 4% carbon was included in the furnace charge.

*Table I*

| Pounds of Oxidized Ferrochromium | Oxygen Blowing Time in Minutes | Percent of Chromium Recovery |
|---|---|---|
| 9,940 | 63 | 83.6 |
| 10,440 | 60 | 91.6 |
| 11,300 | 64 | 84.5 |
| 10,840 | 84 | 94.3 |
| 11,800 | 61 | 91.2 |

The results of the above heats indicate than an average heat under the conditions of the heats of Table I using 10,864 lbs. of oxidized ferrochromium will yield 89% chromium recovery with an oxygen blowing time of 66 minutes.

In comparison to the above process utilizing oxidized ferrochromium in the furnace charge, the following table shows three heats in which unoxidized ferrochromium containing approximately 4% carbon was used.

*Table II*

| Pounds of Unoxidized Ferrochromium | Oxygen Blowing Time in Minutes | Percent of Chromium Recovery |
|---|---|---|
| 9,860 | 57 | 86.2 |
| 9,660 | 76 | 87.2 |
| 10,520 | 77 | 89.7 |

The average of the heats in Table II using 10,013 lbs. of unoxidized ferrochromium in the furnace charge indicates a chromium recovery of 87.7% with an oxygen blowing time of 70 minutes. In all instances the carbon content was reduced to approximately .05% by weight.

The above experiments and other experiments conducted by us show that, contrary to what might be expected, oxidized ferrochromium gives at least as good chromium recovery as unoxidized ferrochromium, and there is also a reduction in the blowing time.

In the making of stainless steels, the components or composition is determined to a considerable extent by economic factors prevailing at the time of manufacture. Thus, for example, the amount of stainless steel scrap utilized may be reduced or even eliminated depending upon its availability and price. In the latter circumstance, larger amounts of other components, such as high carbon ferrochromium, are included in the charge. The use of an added quantity of high carbon ferrochromium is limited by the availability and effectiveness of oxygen removing facilities.

Irrespective of other conditions of the steel making process such as the type and amounts of components of the charge, the oxidized ferrochromium employed in applicant's process will facilitate the removal of carbon from the charge, including a lessening of the time of blowing gaseous oxygen over the surface of the melt.

The preceding description of a specific embodiment of the invention has been provided for purposes of illustration and the invention is to be limited only by the scope of the appended claims.

We claim:

1. The process of making a chromium-containing steel comprising the steps of charging a furnace with chromium-bearing steel scrap and 1–5% carbon ferrochromium containing 1–5% oxygen, by weight, of heating said charge until the components are liquid, and of then blowing the surface with oxygen until the carbon content is reduced to less than 0.1%.

2. The process of making a chromium-bearing steel comprising the steps of charging a furnace with (a) approximately 95%, by weight, of chromium-bearing steel scrap and carbon steel scrap, and with (b) approximately 5%, by weight, of a 1–5% carbon ferrochromium containing 1–5% oxygen, by weight, of heating said charge until the components are liquid, and of then blowing the surface with oxygen-containing gas until the carbon content is reduced to less than 0.1%.

3. The process of claim 2 wherein the oxidized carbon ferrochromium has a grain size of $1/16$ to $1/2$ inch.

4. The process of claim 2 wherein the oxygen ratio in the 1–5% carbon ferrochromium is 0.5 to 2.5 parts oxygen to 1 part carbon, by weight.

5. The process of making a steel containing 15–20% chromium which comprises the steps of charging a furnace with in excess of 90% of steel scrap having the selected chromium content, and with an oxidized ferrochromium containing approximately 4% carbon, the oxygen being between 0.5 and 2.5 parts to 1 part of carbon, by weight, of heating said charge until the components are liquid, of then blowing the surface with oxygen-containing gas until the carbon is reduced to the selected end product percentage, and of then adding pure chromium in solid form to bring the mix to specification.

6. The process of claim 5 wherein the oxidized ferrochromium in the original charge has a granule size of from $1/16$ to $1/2$ inch.

References Cited in the file of this patent

UNITED STATES PATENTS

| | | |
|---|---|---|
| 637,013 | McKenna | Nov. 14, 1899 |
| 1,793,153 | Becket et al. | Feb. 17, 1931 |
| 2,170,158 | Rennerfelt | Aug. 22, 1939 |

FOREIGN PATENTS

| | | |
|---|---|---|
| 539,461 | Great Britain | Sept. 11, 1941 |